(12) United States Patent
Kumei et al.

(10) Patent No.: US 8,778,549 B2
(45) Date of Patent: Jul. 15, 2014

(54) FUEL CELL SYSTEM

(75) Inventors: Hideyuki Kumei, Suntogun (JP); Manabu Kato, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 925 days.

(21) Appl. No.: 12/597,505

(22) PCT Filed: Mar. 7, 2008

(86) PCT No.: PCT/IB2008/000533
§ 371 (c)(1),
(2), (4) Date: Oct. 26, 2009

(87) PCT Pub. No.: WO2008/132565
PCT Pub. Date: Nov. 6, 2008

(65) Prior Publication Data
US 2010/0136447 A1    Jun. 3, 2010

(30) Foreign Application Priority Data

Apr. 26, 2007 (JP) ................................ 2007-117228

(51) Int. Cl.
*H01M 8/04* (2006.01)
(52) U.S. Cl.
USPC ............................ 429/432; 429/430; 429/431
(58) Field of Classification Search
USPC ................................................ 429/428–451
See application file for complete search history.

(56) References Cited

U.S. PATENT DOCUMENTS

| | | | |
|---|---|---|---|
| 5,624,769 A | 4/1997 | Li et al. | |
| 6,967,065 B1 | 11/2005 | Saitou et al. | |
| 2002/0021109 A1 | 2/2002 | Marvin et al. | |
| 2003/0141188 A1 | 7/2003 | Imamura et al. | |
| 2005/0053810 A1 | 3/2005 | Kato et al. | |
| 2006/0078788 A1 | 4/2006 | Ramschak | |
| 2006/0204825 A1 | 9/2006 | Mazza et al. | |
| 2006/0216567 A1 | 9/2006 | England et al. | |
| 2006/0278450 A1 | 12/2006 | Shirasaka et al. | |

FOREIGN PATENT DOCUMENTS

| | | |
|---|---|---|
| EP | 0 817 297 | 1/1998 |
| EP | 1 458 042 | 9/2004 |
| JP | 63-98711 | 4/1988 |
| JP | 7 272736 | 10/1995 |

(Continued)

OTHER PUBLICATIONS

Machine translation of JP 2007-103114 A (Kubo).*

(Continued)

*Primary Examiner* — Raymond Alejandro
*Assistant Examiner* — Helen McDermott
(74) *Attorney, Agent, or Firm* — Oblon, Spivak, McClelland, Maier & Neustadt, L.L.P.

(57) ABSTRACT

An IR resistance of each of unit cells is measured, and a highest unit cell voltage as a threshold voltage is set based on the IR resistance and load current. The setting of the highest unit cell voltage uses map data that approximates current-voltage characteristics of a unit cell when the fuel gas is insufficiently supplied. In that case, the highest unit cell voltage is determined based on the voltage with respect to the load current obtained from the map data, and the IR loss calculated from the IR resistance and the load current. This highest unit cell voltage is compared with the measured unit cell voltage. If the unit cell voltage is below the highest unit cell voltage, the power generation of the fuel cell is stopped or restrained.

8 Claims, 7 Drawing Sheets

(56) References Cited

FOREIGN PATENT DOCUMENTS

| | | |
|---|---|---|
| JP | 7-282832 | 10/1995 |
| JP | 8-167421 | 6/1996 |
| JP | 9-245826 | 9/1997 |
| JP | 11 67254 | 3/1999 |
| JP | 2000-251913 | 9/2000 |
| JP | 2004 30979 | 1/2004 |
| JP | 2004 241236 | 8/2004 |
| JP | 2006 49259 | 2/2006 |
| JP | 2006 73501 | 3/2006 |
| JP | 2006 147178 | 6/2006 |
| JP | 2007103114 A * | 4/2007 |

OTHER PUBLICATIONS

Rebak, B. Raul et al., " Improved pitting and crevice corrosion resistance of nickel and cobalt based alloys", Proceedings-Electrochemical Society, pp. 289-302, XP002436575, (1999).

Partial English language translation of Office Action issued Aug. 19, 2008, in Japanese Patent Application No. 2003-028493.

* cited by examiner

I-V CHARACTERISTIC MAP AT TIME OF LACK
OF ANODE GAS (AFTER CORRECTION OF IR)

TEMPERATURE MAP OF
PERMISSIBLE NEGATIVE VOLTAGE

FUEL CELL SYSTEM

BACKGROUND OF THE INVENTION

1. Field of the Invention

The invention relates to a fuel cell system.

2. Description of the Related Art

Conventionally, the fuel cell is formed with a plurality of unit cells that is connected in series. Each unit cell generates electric power from a fuel gas containing hydrogen that is supplied to the anode, and an oxidant gas containing oxygen that is supplied to the cathode. The amount of supply of a reactant gas (i.e., the fuel gas or the oxidant gas) needed for each unit cell depends on the required generated current (i.e., load current). Therefore, in a fuel cell system, the amount of supply of the reactant gas is controlled in accordance with the load current so as not to become insufficient.

However, for some causes, a reactant gas in one or more unit cells may sometimes become lack of the amount of supply with respect to the needed amount. Examples of such cases include the case where a gas channel in a unit cell is occluded by the water produced due to the electric power generation, or the case where water is frozen in a gas channel and therefore occludes the gas channel. If the reactant gas becomes lack of the amount of supply with respect to the needed amount, the required current cannot be caused to flow solely by the power generation reactions of the reactant gases (i.e., normal power generation reactions). However, since the unit cells are connected in series, even the unit cell being lack of the supply of the reactant gas is required to cause the flow of the same amount of electric current as the other normal unit cells. Therefore, when the current is forced to flow in the unit cell lacking in the supply of the reactant gas, the following abnormal chemical reactions may occur.

A unit cell lacking in the supply of the fuel gas needs to extract electrons from the anode despite the absence of hydrogen. In consequence, there occur an oxidation reaction of water ($2H_2O \rightarrow O_2 + 4H^+ + 4e^-$), an oxidation reaction of carbon ($C + 2H_2O \rightarrow CO_2 + 4H^+ + 4e^-$) and an elution reaction of Pt ($Pt \rightarrow Pt^{2+} + 2e^-$) as well as an oxidation reaction of an electrolyte component, etc. On the other hand, a unit cell lacking in the supply of the oxidant gas needs to receive, at the cathode, electrons despite the absence of oxygen. In consequence, there occurs a phenomenon in which protons move from the anode side to the cathode side through an electrolyte membrane, and recombine with electrons. That is, a so-called "hydrogen pump phenomenon" occurs.

In particular, the abnormal chemical reactions due to the supply shortage of the fuel gas cause damage and degradation of the MEA (Membrane Electrode Assembly). Therefore, in the fuel cell system, it is important to detect the supply shortage of the fuel gas during an early period. Such detection may be achieved by measuring the voltage of each unit cell. The anode potential of the unit cell lacking in the supply of the fuel gas increases in response to the abnormal chemical reactions, and becomes higher than the cathode potential. That is, a so-called "reverse potential phenomenon" occurs. Therefore, via the voltage (i.e., the reverse potential) monitoring of each unit cell, it may be determined whether the supply the fuel gas is lacking.

According to fuel cell systems of related arts, if a cell voltage of any unit cell falls below a pre-set threshold voltage, a predetermined voltage recovery process is performed; for example, the load current is set to a lower value, or the power generation is temporarily stopped. Technologies related to the reverse potential of a fuel cell are described in, for example, Japanese Patent Application Publication No. 2006-147178 (JP-A-2006-147178), Japanese Patent Application Publication No. 11-67254 (JP-A-11-67254), Japanese Patent Application Publication No. 2004-30979 (JP-A-2004-30979), Japanese Patent Application Publication No. 2006-73501 (JP-A-2006-73501), Japanese Patent Application Publication No. 2006-49259 (JP-A-2006-49259), and Japanese Patent Application Publication No. 2004-241236 (JP-A-2004-241236).

When the fuel cell starts up at low temperature, in particular, starts up at a temperature below the freezing point, gas channels may be occluded by ice or water, and thereby the fuel gas may be insufficiently supplied to the fuel cell. To remove the ice or water occluding a gas channel, the self-heating of the fuel cell may be utilized. To increase the self-heating of the fuel cell, it is effective to cause the amount of supply of the oxidant gas to be in a shortage state. Therefore, by supplying the oxidant gas less than the required amount of the oxidant gas from the load current, the over-voltage of the cathode may be increased and therefore the self-heating of the fuel cell may be accelerated.

When the oxidant gas is supplied insufficiently, the cathode potential greatly falls from a steady operation potential. Furthermore, the resistance of the MEA becomes greater at low temperature, so that the voltage loss due to the resistance of the MEA also becomes conspicuous. As a result, the cell voltage may sometimes become negative, as in the case of the supply shortage of the fuel gas. However, unlike the increase in the anode potential due to the supply shortage of the fuel gas, the decrease in the cathode potential due to the supply shortage of the oxidant gas is allowable. If this is not allowed, the warm-up of the fuel cell cannot be accelerated, so that the startability of the fuel cell at low temperature will decline.

However, only the cell voltage may be measured practically, and thereby each of the anode potential and the cathode potential cannot be practically measured unless a reference electrode is provided. Therefore, according to the fuel cell system of the related arts, when it is forced to insufficiently supply the oxidant gas for the purpose of warming up the fuel cell system at low-temperature startup, it cannot be determined whether the reverse potential of a unit cell resulted from the increase in the anode potential. Hence, the threshold voltage used for the determination as to whether to start the aforementioned voltage recovery process cannot but be set to a higher value for the preferable protection of the membrane electrode assemblies.

SUMMARY OF THE INVENTION

The invention provides a fuel cell system that efficiently prevents the degradation of the MEAs resulting from the supply shortage of the fuel gas without stopping or restraining the power generation unnecessarily.

A negative voltage of a unit cell may be allowed unless the negative voltage of the unit cell results from the increase in the anode potential. Therefore, the fuel cell system of the invention includes means for distinguishing the cause of the negative voltage of the unit cell.

A fuel cell system in accordance with a first aspect of the invention includes; a unit cell that generates electric power by an electrochemical reaction between a fuel gas supplied to an anode of the unit cell and an oxidant gas supplied to a cathode of the unit cell; a fuel cell that is formed with the unit cell; voltage measurement means for measuring a voltage of the unit cell; power generation control means for restraining the power generation of the fuel cell when the voltage of the unit cell is below a predetermined threshold voltage; IR resistance measurement means for measuring an IR resistance of the unit cell; and threshold voltage setting means for setting the predetermined threshold voltage based on the IR resistance and a load current.

The threshold voltage setting means may store map data that approximates current-voltage characteristics when the fuel gas is insufficiently supplied to the anode, and may set the predetermined threshold voltage based on the voltage with respect to the load current obtained from the map data and an IR loss calculated from the IR resistance and the load current.

The fuel cell system may further include cell temperature measurement means for measuring a temperature of the unit cell, and the threshold voltage setting means may store map data that approximates current-voltage characteristics at a plurality of cell temperatures when the fuel gas is insufficiently supplied to the anode, and may set the predetermined threshold voltage based on the voltage with respect to the load current and the cell temperature obtained from the map data and an IR loss calculated from the IR resistance and the load current.

The fuel cell system may further include oxidant gas supply control means for insufficiently supplying the oxidant gas to the fuel cell with respect to a required amount of the oxidant gas from the load current.

A fuel cell system in accordance with a second aspect of the invention includes; a unit cell that generates electric power by an electrochemical reaction between a fuel gas supplied to an anode of the unit cell and an oxidant gas supplied to a cathode of the unit cell; a fuel cell that is formed with the unit cell; voltage measurement means for measuring a voltage of the unit cell; power generation control means for restraining the power generation of the fuel cell when the voltage of the unit cell is below a predetermined threshold voltage; cell temperature measurement means for measuring a temperature of the unit cell; and threshold voltage setting means for setting the predetermined threshold voltage based on the measured temperature of the unit cell.

The fuel cell system may further include oxidant gas supply control means for insufficiently supplying the oxidant gas to the fuel cell with respect to a required amount of the oxidant gas from the load current.

The threshold voltage setting means may store map data that predicts a temperature dependency of an IR resistance of the unit cell, and sets the predetermined threshold voltage based on an IR loss calculated from the load current and the IR resistance with respect to the cell temperature obtained from the map data.

A fuel cell system in accordance with a third aspect of the invention include; a unit cell that generates electric power by an electrochemical reaction between a fuel gas supplied to an anode of the unit cell and an oxidant gas supplied to a cathode of the unit cell; a fuel cell that is formed with the unit cell; oxidant gas supply control means for switching between a first supplying mode that sufficiently supplies the oxidant gas to the fuel cell in accordance with a required amount of the oxidant gas from the load current and a second supplying mode that insufficiently supplies the oxidant gas to the fuel cell in accordance with the required amount of the oxidant gas; voltage measurement means for measuring a voltage of the unit cell; power generation control means for restraining the power generation of the fuel cell when the voltage of the unit cell is below a predetermined threshold voltage; and threshold voltage setting means for setting the predetermined threshold voltage in accordance with the supplying mode of the oxidant gas A fuel cell system in accordance with a third aspect of the invention include; a unit cell that generates electric power by an electrochemical reaction between a fuel gas supplied to an anode of the unit cell and an oxidant gas supplied to a cathode of the unit cell; a fuel cell that is formed with the unit cell; voltage measurement means for measuring a voltage of the unit cell; unit cell voltage control means for restraining a decrease of the voltage of the unit cell when the voltage of the unit cell fell to a predetermined threshold voltage; oxidant gas supply means for supplying the oxidant gas to the fuel cell; oxidant gas supply control means for switching between an amount of the supply of the oxidant gas in accordance with a first power generation efficiency of the fuel cell and an amount of the supply of the oxidant gas in accordance with a second power generation efficiency that is lower than the first power generation efficiency; and threshold voltage setting means for setting the predetermined threshold voltage in accordance with the power generation efficiency of the fuel cell. The unit cell voltage control means restrains the decrease of the voltage of the unit cell using a lower threshold voltage than that of the first power generation efficiency when the fuel cell generates power at the second power generation efficiency.

The oxidant gas supply control means may switch between an amount of the supply of the oxidant gas in accordance with a first heat value of the fuel cell and an amount of the supply of the oxidant gas in accordance with a second heat value that is greater than the first heat value, and the unit cell voltage control means may restrain the decrease of the voltage of the unit cell using a lower threshold voltage than that of the first heat value when the fuel cell generates power at the second heat value.

The unit cell voltage control means may reduce a load current when the voltage of the unit cell fell to the predetermined threshold voltage.

The fuel cell may be formed by connecting a plurality of the unit cell in series.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Prior to the description of embodiments of the invention, the reverse potential will be explained with reference to FIGS. 1, 2 and 3.

Figure 1:
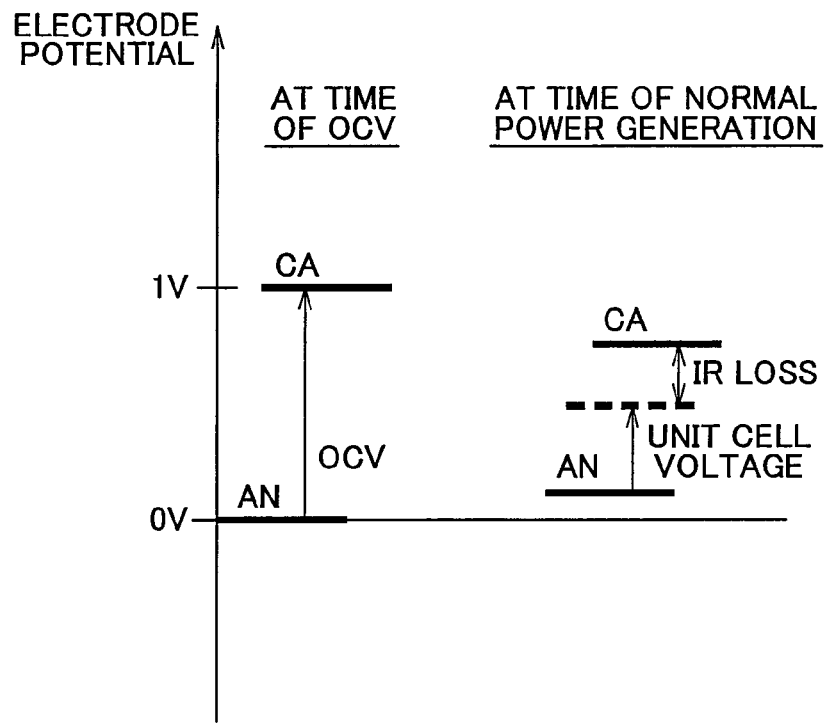
FIG. 1 is a diagram showing the electrode potentials of a unit cell in the comparison between the conditions of an open-circuit voltage and a normal power generation.

FIG. 1 is a diagram showing the electrode potentials of a unit cell in the comparison between the conditions of an open-circuit voltage (hereinafter, simply referred to as "OCV") and a normal power generation. In FIG. 1, the anode potential is represented by "AN", and the cathode potential is represented by "CA". It is assumed herein that the anode potential at the time of OCV is 0 V, and the cathode potential is 1 V. As shown in FIG. 1, during normal power generation, that is, when a load is applied to the unit cells, the anode potential slightly rises and the cathode potential slightly falls. Furthermore, the IR loss (i.e., the unit cell voltage loss) occurs due to the IR resistance of each unit cell (i.e., the internal resistance of each unit cell), so that the apparent cathode potential (shown by a dotted line in FIG. 1) further falls. The potential difference between the apparent cathode potential and the anode potential is a unit cell voltage at the time of power generation. Incidentally, a relationship among the unit cell voltage, the cathode potential, the anode potential and the IR loss at the time of power generation may be expressed by the following equation (1).

$$\text{Unit cell voltage} = \text{Cathode potential} - \text{Anode potential} - \text{IR loss} \quad (1)$$

Figure 2:
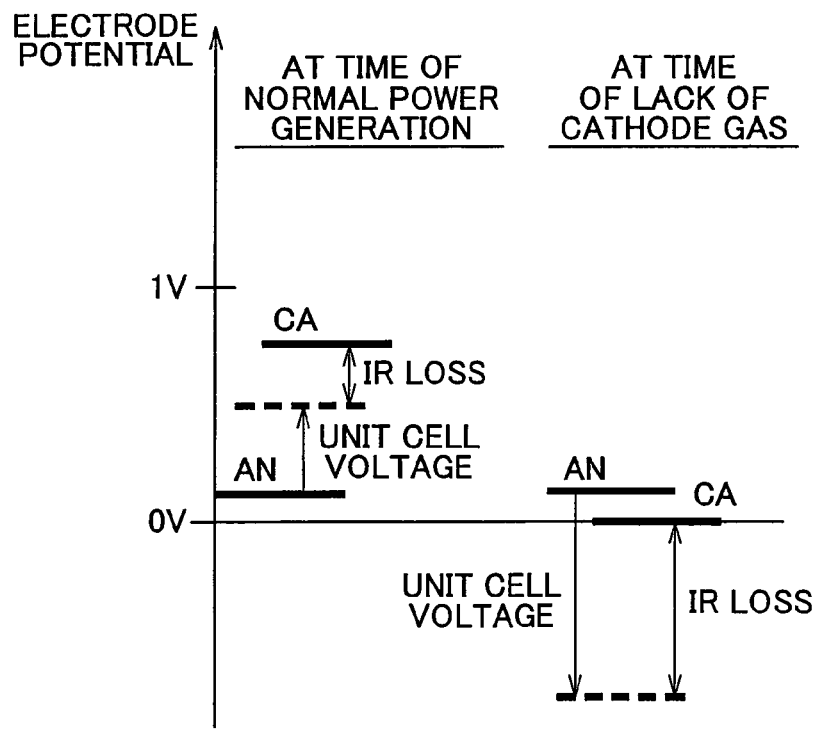
FIG. 2 is a diagram showing the electrode potentials of a unit cell in the comparison between the conditions of the normal power generation and lack of the cathode gas.

At the time of power generation, when a unit cell is lack of the cathode gas (i.e., when the oxidant gas is insufficiently supplied), the electrode potentials of each unit cell become as shown in FIG. 2. FIG. 2 is a diagram showing the electrode potentials in the comparison between the conditions of the normal power generation and lack of the cathode gas. At the time of lack of the cathode gas, the cathode potential falls. In consequence, the difference between the cathode potential and the anode potential is reduced, and sometimes the cathode potential may become lower than the anode potential as shown in FIG. 2. The apparent cathode potential (shown by a dotted line in FIG. 2) including the IR loss as well becomes further lower, so that the unit cell voltage indicates a negative value.

Figure 3:
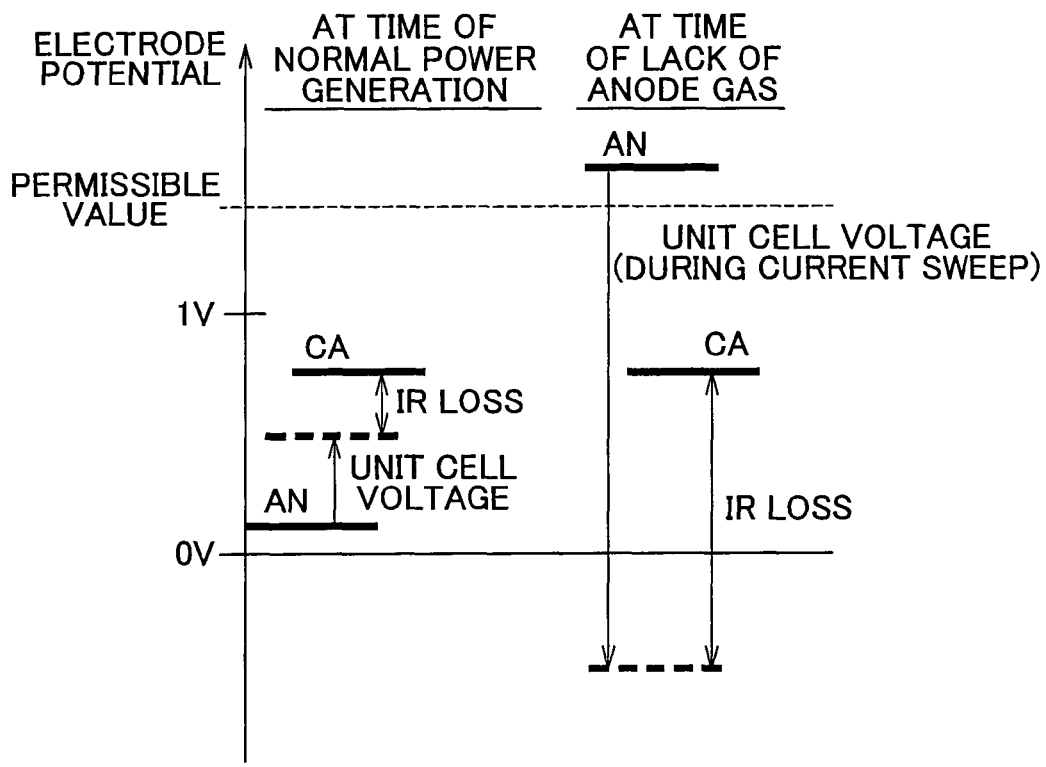
FIG. 3 is a diagram showing the electrode potentials of a unit cell in the comparison between the conditions of the normal power generation and the lack of the anode gas.

On the other hand, at the time of power generation, when a unit cell is lack of the anode gas (i.e., when the fuel gas is insufficiently supplied), the electrode potentials of each unit cell become as shown in FIG. 3. FIG. 3 is a diagram showing the electrode potentials in the comparison between the conditions of the normal power generation and the lack of the anode gas. As shown in FIG. 3, at the time of lack of the anode gas, the anode potential greatly rises to become higher than the cathode potential. That is, the reverse potential occurs, as is the case with the time of lack of the cathode gas. During the current sweep, the IR loss occurs, so that the apparent cathode potential (shown by a dotted line in FIG. 3) falls. As a result, the unit cell voltage indicates a large negative value.

Thus, in both the case of the lack of the anode gas and the case of the lack of the cathode gas, the unit cell voltage may indicate the negative value. However, the reverse potential phenomenon due to the lack of the anode gas may be a problem. As the anode potential rises beyond a permissible value, chemical reactions such as the oxidation reaction of carbon and the elusion reaction of Pt which lead to degradation of an MEA occurs. On the other hand, although the "hydrogen pump phenomenon" may occur in the case of the lack of the cathode gas, there is an advantage of accelerating the self-heating of each unit cell by effectively utilizing the lack of the cathode gas when the fuel cell starts up at low temperature.

Therefore, in the invention, only the negative cell voltage due to the lack of the anode gas is regarded as an unallowable reverse potential while the negative cell voltage due to the lack of the cathode gas is allowed. That is, in the case where the reverse potential phenomenon occurs, a predetermined voltage recovery process is performed only when it is estimated that the reverse potential results from the lack of the anode gas. In this manner, it is possible to prevent degradation of the MEAs resulting from the lack of the anode gas without unnecessarily carrying out the voltage recovery process.

Next, a method of determining the cause of the negative cell voltage will be described. If each unit cell is provided with a reference electrode to measure the anode potential and the cathode potential, it is easy to determine whether the negative cell voltage results from the lack of the anode gas. However, in a fuel cell consisting of many unit cells, it is practically difficult to provide each unit cell with reference electrodes and measure the anode potential and the cathode potential. On the other hand, the unit cell voltage, that is, the difference between the apparent cathode potential and the anode potential may be measured with ease. The following two determination methods are each a method in which the cause of the negative cell voltage may be determined based on the unit cell voltage that is practically measurable.

The first determination method is a method in which the highest unit cell voltage is calculated for each unit cell at the time of lack of the anode gas, and is compared with the measured unit cell voltage. As shown in FIG. 3, the unit cell voltage at the time of lack of the anode gas varies in accordance with the IR loss. However, the highest unit cell voltage is obtained when the IR loss is minimum, that is, when the electrolyte membrane of a polymer electrolyte fuel cell is in the moistest condition. Therefore, if the measured unit cell voltage is greater than the highest unit cell voltage at the time of lack of the anode gas, it may be determined that the negative cell voltage does not result form the lack of the anode gas.

Incidentally, the foregoing highest unit cell voltage may be obtained by the following method. When it is forced to supply the anode gas insufficiently and perform the electric power generation of a unit cell (test-purpose unit cell), a change in the potential difference with respect to the then load current is measured. Then, from the measured current-voltage (I-V) characteristics at the time of lack of the anode gas, map data is prepared, and is stored in the control device of a fuel cell system. Next, the IR resistance of each unit cell of the fuel cell is measured, and an IR loss is calculated from the measured IR resistance and the load current at the time of power generation. By correcting the voltage value of the map data with the IR loss, the highest unit cell voltage at the time of lack of the anode gas may be obtained for each unit cell.

The second determination method is a method in which the unit cell voltage where the lack of only the cathode gas has occurred is estimated, and is compared with the measured unit cell voltage. As shown in FIG. 2, at the time of lack of the cathode gas, the difference between the cathode potential and the anode potential is very small. Therefore, unless the anode potential due to the lack of the anode gas rises, the unit cell voltage at the time of lack of the cathode gas generally becomes equal to the negative cell voltage caused by the IR loss. Consequently, if the measured unit cell voltage becomes lower than the negative cell voltage caused by the IR loss, it may be determined that a rise in the anode potential due to the lack of the anode gas occurs.

Incidentally, the IR resistance that is necessary for calculating the IR loss may also be measured using a measurement appliance. Alternatively, the IR resistance may also be estimated from the temperature of the unit cell because the IR resistance greatly depends on the temperature of the MEA. If the temperature dependency of the IR resistance is predicted and map data is prepared and the map data is stored in the control device of the fuel cell system, the IR resistance may be obtained using a measured temperature from a thermometer.

In the fuel cell system in accordance with the following Embodiment 1, the power generation of the fuel cell system is controlled using the foregoing first determination method. In the fuel cell system in accordance with the following Embodiment 2 of the invention, the power generation of the fuel cell system is controlled using the foregoing second determination method. Details of the embodiments will be described with reference to the drawings.

Embodiment 1 of the invention will be described with reference to FIGS. 4 to 7.

Figure 4:
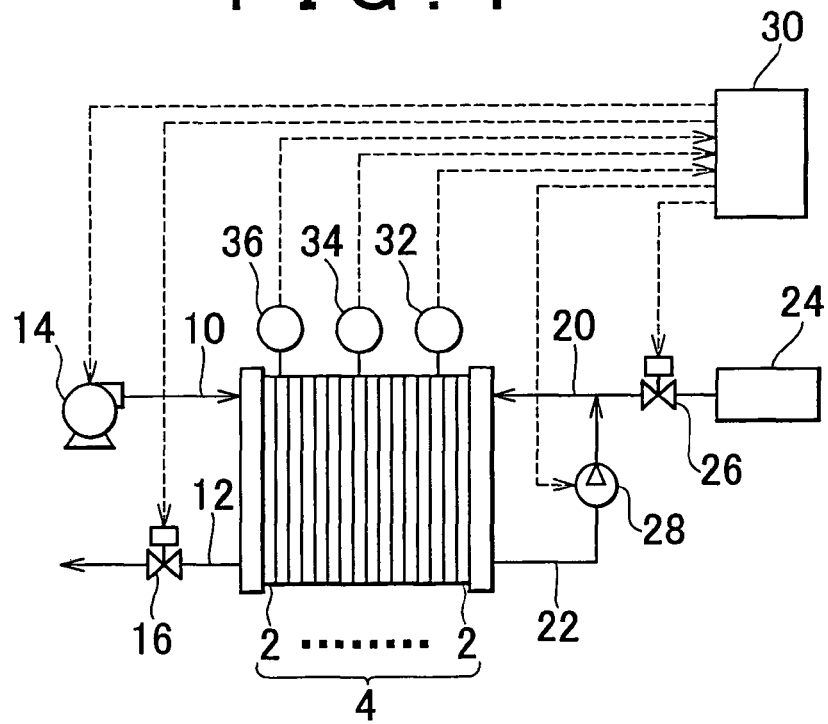
FIG. 4 is a schematic construction diagram of a fuel cell stack according to an embodiment of the invention.

A fuel cell system according to Embodiment 1 of the invention shown in FIG. 4 will be described below. While FIG. 4 shows an example of the construction of the fuel cell system to which the invention may be applied, the invention is also applicable to fuel cell systems having other constructions. For example, although FIG. 4 shows a so-called "anode gas recirculation system", the invention is also applicable to a so-called "anode dead end system" in which the anode gas is not recirculated.

As shown in FIG. 4, the fuel cell system is provided with a fuel cell 4 as an electric power supply source. The fuel cell 4 is constructed of a plurality of unit cells 2 connected in series. Each unit cell 2 generates electric power from a fuel gas containing hydrogen that is supplied to the anode (hereinafter, referred to as "anode gas") and an oxidant gas containing oxygen that is supplied to the cathode (hereinafter, referred to as "cathode gas").

A cathode gas passage 10 for supplying the cathode gas is connected to a cathode inlet of the fuel cell 4. Furthermore, a cathode-off-gas passage 12 for discharging an off-gas from the cathode is connected to a cathode outlet of the fuel cell 4. This fuel cell system uses air as the cathode gas. An air compressor 14 is disposed at an inlet of the cathode gas passage 10. By the air compressor 14, air is taken in from the atmosphere, and is pumped to the cathode gas passage 10. The cathode-off-gas passage 12 is provided with a first pressure-regulating valve 16.

An anode gas passage 20 for supplying the anode gas is connected to an anode inlet of the fuel cell 4. Furthermore, an anode-off passage 22 for returning an off-gas from the anode (i.e., anode-off-gas) back to the anode gas passage 20 is connected to an anode outlet of the fuel cell 4. In this fuel cell system, the anode gas is supplied from an anode gas supplier 24, such as a hydrogen tank, a reformer, etc., to the anode gas passage 20. A second pressure-regulating valve 26 is disposed on the anode gas passage 20. A pump 28 for recirculating the anode-off-gas is disposed on the anode-off-gas passage 22.

In this fuel cell system, the power generation of the fuel cell 4 is controlled by a control unit 30. Actuators of the air compressor 14, the first pressure-regulating valve 16, the second pressure-regulating valve 26, the pump 28, etc., are connected to the output side of the control unit 30. On the other hand, a voltmeter 32 for measuring the unit cell voltage of each unit cell 2, a resistance meter 34 for measuring the IR resistance of each unit cell 2, and a thermometer 36 for measuring the temperature of each unit cell 2 are connected to the input side of the control unit 30. The control unit 30 determines the state of power generation of the fuel cell 4 based on the measurement values from measurement appliances 32, 34, 36, and adjusts the operation range of each actuator based on the result of the determination.

Figure 5:
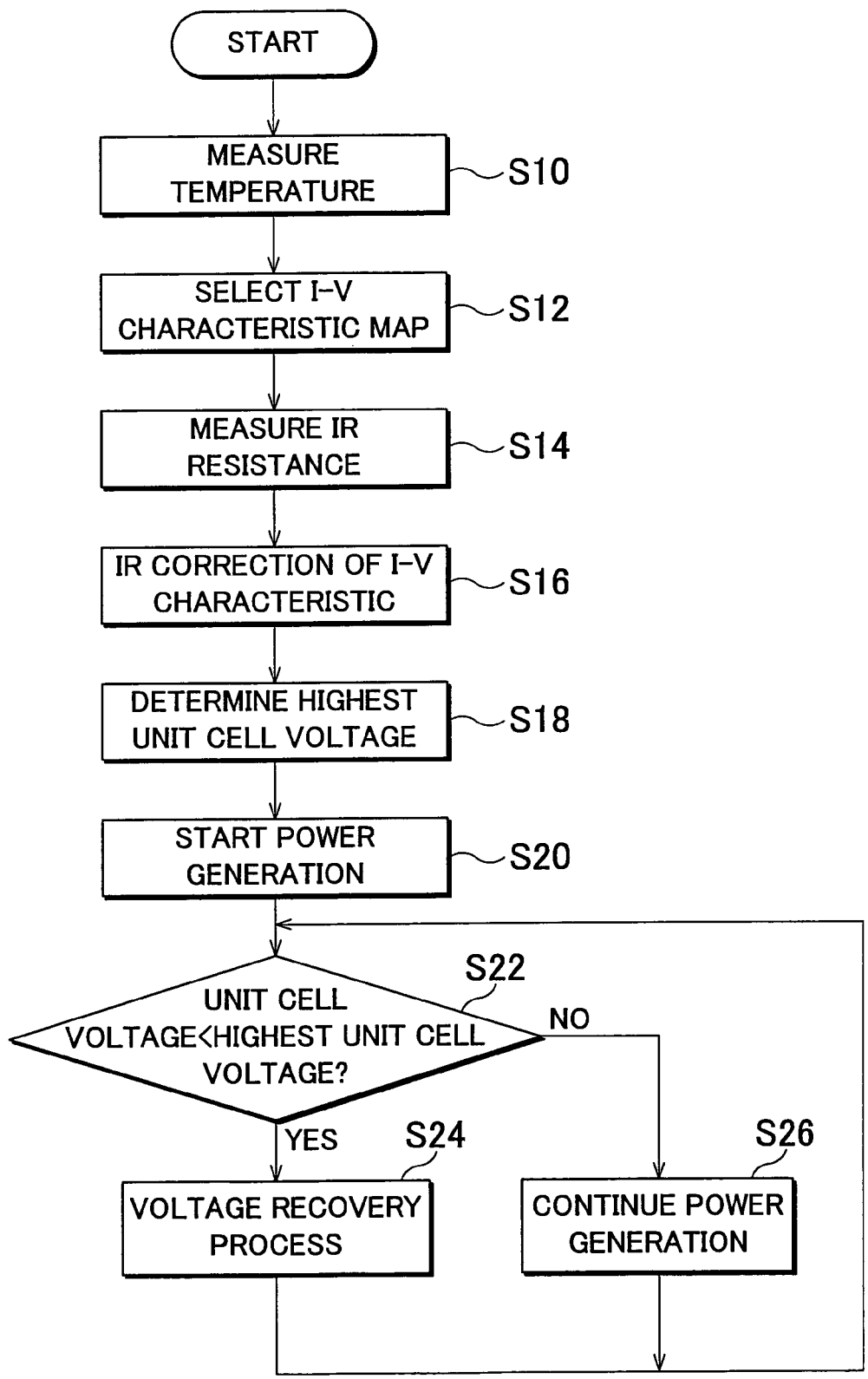
FIG. 5 is a flowchart showing a control routine for power generation of the fuel cell that is executed in Embodiment 1 of the invention.

In this Embodiment 1, the control unit 30 controls the power generation of the fuel cell 4 in accordance with the routine shown in FIG. 5. The routine shown in FIG. 5 is executed when the fuel cell system starts up.

In step S10 of the routine shown in FIG. 5, the temperature of each unit cell 2 is measured by the thermometer 36. Subsequently in step S12, an I-V characteristic map according to the measured temperature of the unit cell is selected for each of the unit cells 2. The I-V characteristic map refers to "map data obtained by approximation to the I-V characteristic at the time of lack of the anode gas" as described in the first determination method. In Embodiment 1, I-V characteristic maps are prepared at various temperatures. This is because the I-V characteristics of the unit cell 2 at the time of lack of the anode gas vary in accordance with the unit cell temperature.

Figure 6:
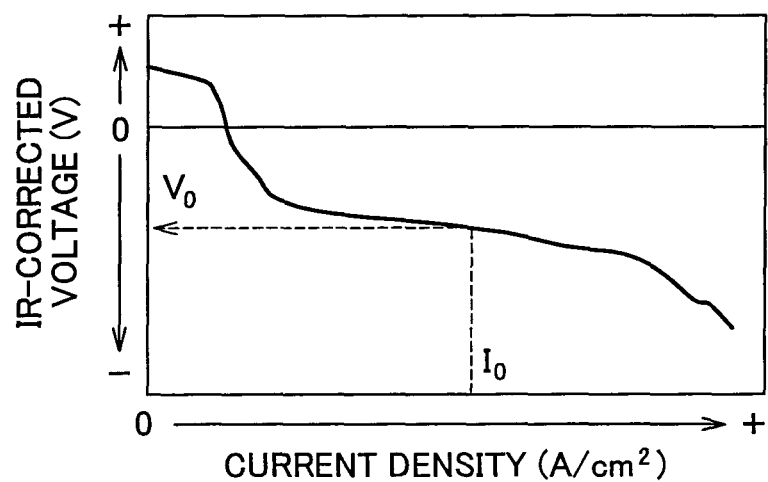
FIG. 6 is a diagram showing an I-V characteristic map for use in the control routine of FIG. 5 when a unit cell is lack of the anode gas.

In step S14, the IR resistance of each unit cell 2 is measured by the resistance meter 34. Then, in step S16, the voltage in the I-V characteristic map is corrected by the amount of the IR loss. This is termed "the IR correction of the I-V characteristic". The IR loss of each unit cell 2 may be calculated from the load current (current density) and the measured IR resistance. FIG. 6 is a diagram showing the I-V characteristics after the IR correction, that is, a relationship between the IR-corrected voltage and the current density at the time of lack of the anode gas.

In step S18, the highest cell voltage of each unit cell 2 is determined using the I-V characteristic map after the IR correction. Concretely, an IR-corrected voltage $V_0$ that corresponds to current density $I_0$ at the time of power generation is obtained from the map as shown in FIG. 6, and the IR-corrected voltage $V_0$ is regarded as the highest unit cell voltage. If the measured unit cell voltage is greater than the calculated highest unit cell voltage, it may be determined that there is no possibility of the lack of the anode gas in the unit cell 2. On the other hand, if the measured unit cell voltage is less than the calculated highest unit cell voltage, it may be determined that there is a possibility of the lack of the anode gas in the unit cell 2. Since the highest unit cell voltage is calculated reflecting the IR loss, the unit cell voltage may fall due to an increase in the IR loss. However, this will not be confused with the cell voltage fall resulting from a rise in the anode potential.

Subsequently in step S20, the power generation of the fuel cell 4 is started. Then, in step S22, the cell voltage of each unit cell 2 is measured by the voltmeter 32, and it is determined whether the measured unit cell voltage is below the highest unit cell voltage of the step S18. The determination in step S22 is performed for each unit cell 2.

If the unit cell voltage of any of the unit cells 2 is below the highest unit cell voltage in step S22 (i.e., YES in S22), the process of step S24 is selected. In step S24, a predetermined voltage recovery process is carried out. The voltage recovery process is a process for recovering the voltage by lowering the load on the fuel cell 4. Examples of the process include: i) lowering the air stoichiometric ratio by changing the rotation speed of the air compressor 14; ii) raising the recirculation rate of the anode gas by changing the rotation speed of the pump 28; iii) lowering the power generation of the fuel cell 4 by increasing the electric power supplied by the secondary battery. The voltage recovery process is carried out until the unit cell voltage becomes greater than the highest unit cell voltage in the entire unit cells 2.

If the unit cell voltage is above the highest unit cell voltage in the entire unit cells 2 in step S22 (i.e., NO in S22), the process of step S26 is selected. In step S26, the normal power generation is continued.

According to the routine described above, the threshold voltage concerned with the voltage recovery process (i.e., the highest unit cell voltage) may be set at a minimum value in such a range that the anode potential does not exceed the permissible value. By strictly setting the threshold voltage in this manner, it becomes possible to prevent the power generation from being stopped or restrained by the unnecessary performance of the voltage recovery process.

Furthermore, the foregoing routine may be carried out in a combination with the warm-up power generation at the time of a low-temperature startup of the fuel cell 4. The warm-up power generation is an operation method that increases the over-voltage of the cathode to accelerate the self-heating of the fuel cell 4 up by insufficiently supplying the cathode gas to the fuel cell 4 with respect to the required supply amount of the cathode gas from the load current, that is, by actively causing the lack of the cathode gas. By causing the lack of the cathode gas, the cathode potential falls. However, the confusion between the fall in the cathode potential and a rise in the anode potential may be prevented by carrying out the foregoing routine.

Incidentally, in Embodiment 1, the control unit 30 carrying out the processes of steps S22 and S24 may be regarded as "electric power generation control means" in the invention. Besides, the control unit 30 carrying out the processes of steps S10, S12, S14, S16 and S18 may be regarded as "threshold voltage setting means" in the invention. Besides, the control unit 30 carrying out the aforementioned warm-up power generation may be regarded as "oxidant gas supply control means" in the invention.

Figure 7:
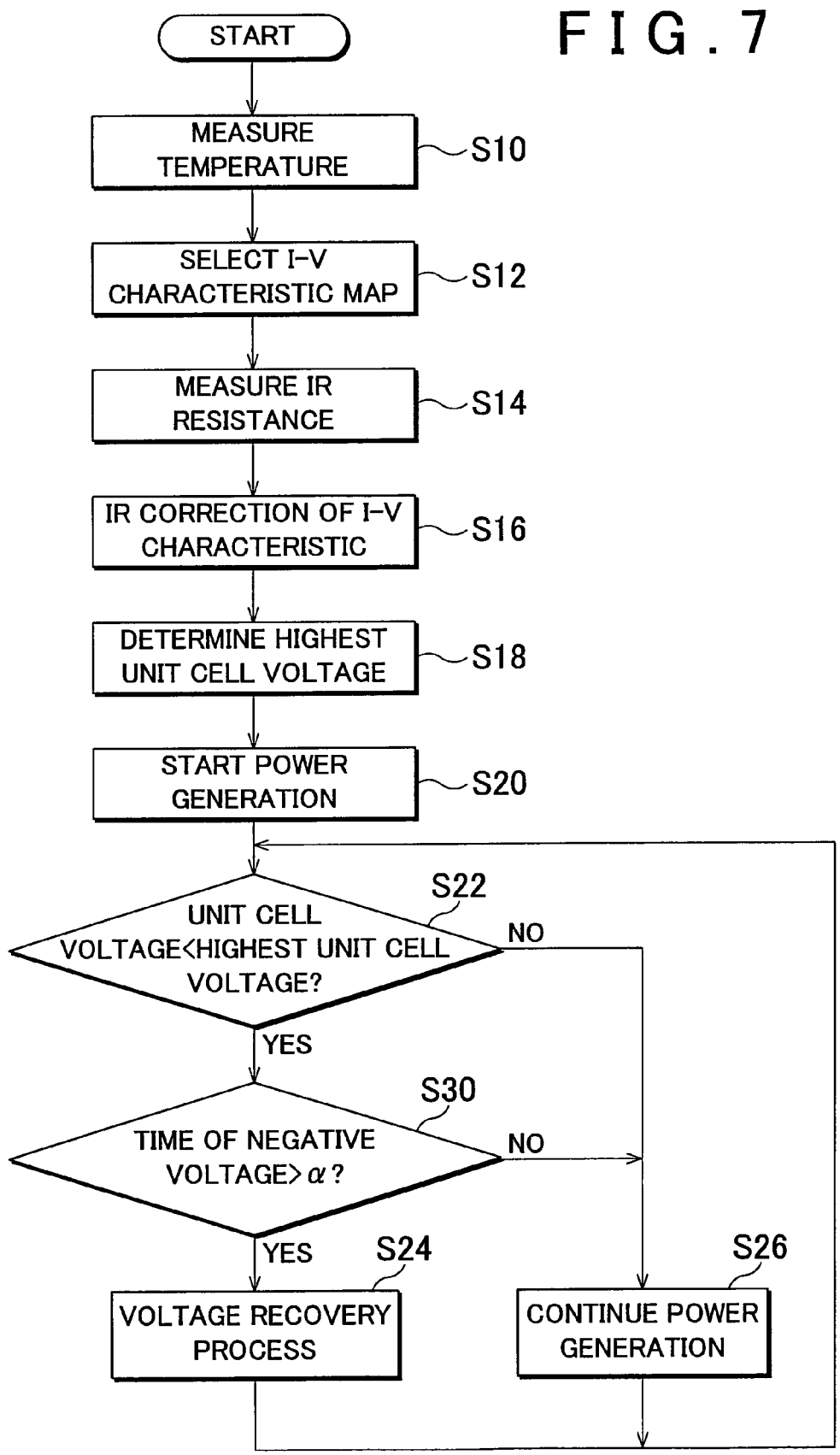
FIG. 7 is a flowchart showing another control routine for power generation of the fuel cell that is executed in the modification of Embodiment 1 of the invention.

In a modification of Embodiment 1, the routine shown by the flowchart of FIG. 5 may be replaced with a routine shown by the flowchart of FIG. 7. Incidentally, the routine shown in FIG. 7 includes the similar processes to those of the routine shown in FIG. 5. These similar processes are assigned with the same step numbers in FIG. 7.

In the routine shown in FIG. 7, if the condition of step S22 is satisfied, the determination in step S30 is carried out. In step S22, the unit cell voltage of each unit cell 2 is measured by the voltmeter 32, and it is determined whether the measured cell voltage is below the highest unit cell voltage of the step S18. If the unit cell voltage of any of the unit cells 2 is below the highest unit cell voltage, the determination in step S30 is carried out.

In step S30, the elapsed time after the unit cell voltage of the unit cell 2 whose unit cell voltage is below the highest unit cell voltage became negative is measured. Then, it is determined whether the elapsed time has exceeded a predetermined permissible time α. The permissible time α is set based on the service life years of the fuel cell system, or the service life years of the vehicle in which the fuel cell system is mounted.

If in step S30 the elapsed time after the unit cell voltage became negative has exceeded the permissible time α, the process of step S24 is selected. In step S24, a predetermined voltage recovery process is carried out. On the other hand, if the elapsed time after the unit cell voltage became negative has not reached the permissible time α, the process of step S26 is selected even if the unit cell voltage is below the highest unit cell voltage. In step S26, the normal power generation is continued.

Even if the unit cell voltage falls below the highest unit cell voltage, it does not necessarily mean that such a degradation of the MEA occurs and the power generation becomes impossible immediately. With regard to this, according to the routine shown in FIG. 7, even if the unit cell voltage becomes negative, the negative condition of the unit cell voltage is permitted for a while, and therefore the normal power generation may be continued for a corresponding period.

Next, Embodiment 2 of the invention will be described with reference to FIGS. 4, 8 and 9. A fuel cell system as Embodiment 2 of the invention may be basically described with reference to FIG. 4, similarly to Embodiment 1. That is, the fuel cell system according to Embodiment 2 of the invention has a construction omitting the resistance meter 34 from the construction shown in FIG. 4.

Figure 8:
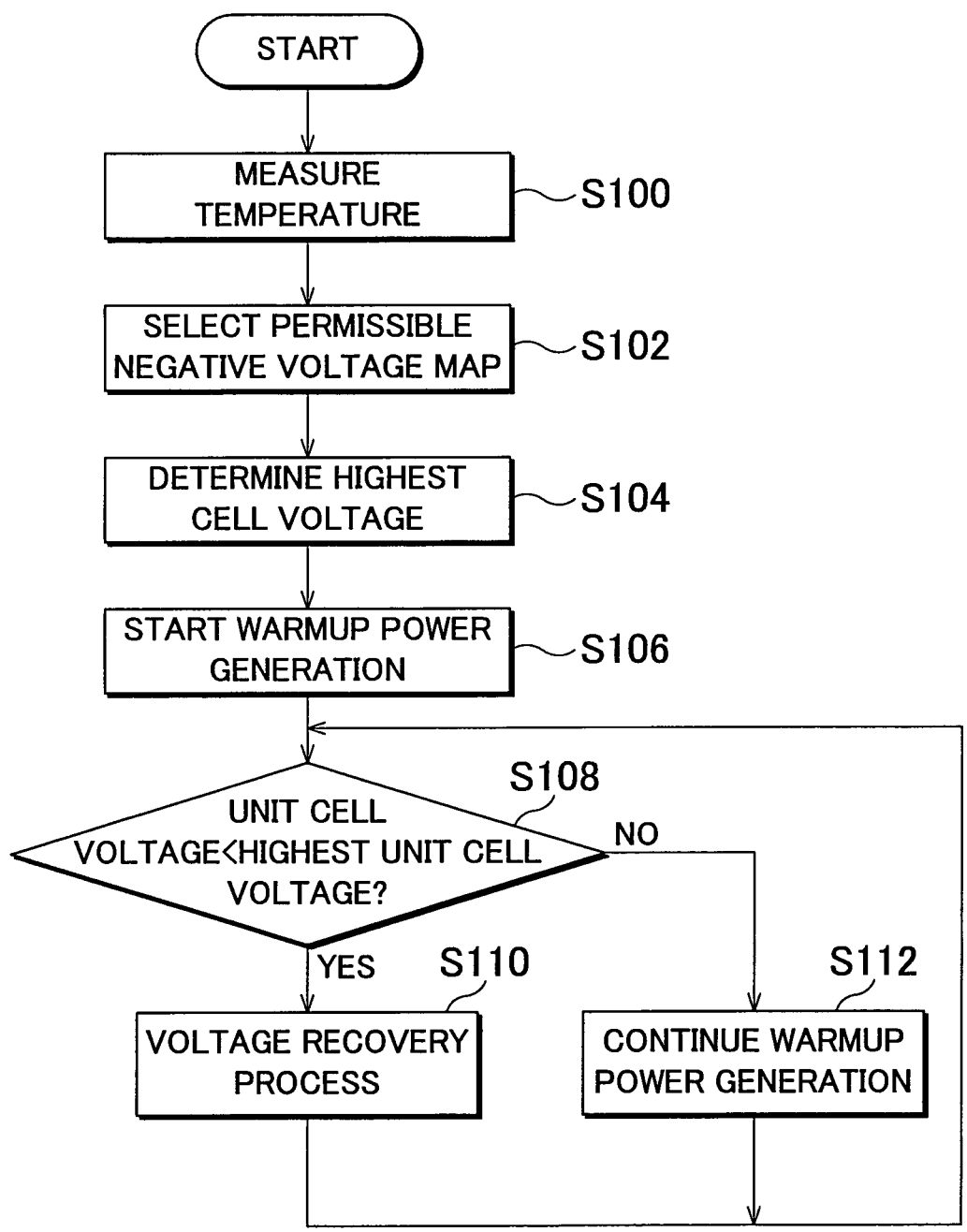
FIG. 8 is a flowchart showing still another control routine for power generation of the fuel cell that is executed in Embodiment 2 of the invention.
Figure 9:
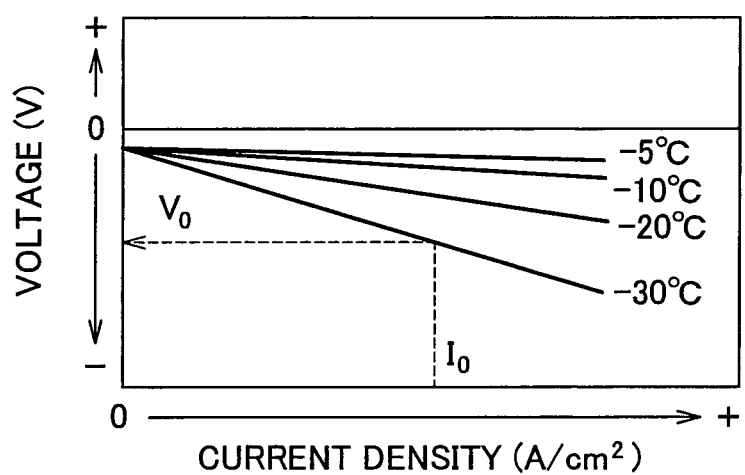
FIG. 9 is a diagram showing a temperature map of the permissible negative potential for use in the control routine of FIG. 8.

In Embodiment 2, the control unit 30 controls the power generation of the fuel cell 4 in accordance with a routine shown by the flowchart of FIG. 8. The routine shown in FIG. 8 is executed when the fuel cell system starts up.

In step S100 in the routine shown in FIG. 8, the temperature of each unit cell 2 is measured by the thermometer 36. Subsequently in step S102, a permissible negative cell voltage map according to the measured unit cell temperature is selected for each unit cell 2. An example of the permissible negative cell voltage map is shown in FIG. 9. As shown in FIG. 9, the permissible negative cell voltage map represents the permissible negative cell voltage with respect to the load current (current density) at various temperatures. The permissible unit cell voltage in this map corresponds to the IR loss that is calculated based on the IR resistance and the current density. As described above in conjunction with the second determination method, map data obtained with the prediction of the temperature dependency of the IR resistance is pre-stored in the control unit 30. The control unit 30 reads from the map data an IR resistance depending on the unit cell temperature, and calculates an IR loss (permissible negative cell voltage) based on the IR resistance and the current density.

Subsequently in step S104, the highest cell voltage of each unit cell 2 is determined using the permissible negative cell voltage map. Concretely, a permissible negative cell voltage $V_0$ that corresponds to the current density $I_0$ at the time of power generation is obtained from a map as shown in FIG. 9, and is regarded as the highest cell voltage. If the unit cell voltage is greater than the highest unit cell voltage, it may be determined that there is no possibility of the lack of the anode gas in the unit cell 2. On the other hand, if the unit cell voltage is below the highest unit cell voltage, it may be determined that there is a possibility of the lack of the anode gas in the unit cell 2. Since the highest unit cell voltage is calculated reflecting the IR loss, the unit cell voltage may fall due to an increase in the IR loss. However, this will not be confused with the cell voltage fall resulting from a rise in the anode potential.

Subsequently in step S106, the warm-up power generation of the fuel cell 4 is started. In the warm-up power generation, the over-voltage of the cathode is increased to accelerate the self-heating of the fuel cell 4 up by insufficiently supplying the cathode gas to the fuel cell 4 with respect to the required supply amount of the cathode gas from the load current, that is, by actively causing the lack of the cathode gas.

Then, in step S108, the unit cell voltage of each unit cell 2 is measured by the voltmeter 32, and it is determined whether the measured cell voltage is below the highest unit cell voltage of the step S104. The determination in step S108 is performed for each unit cell 2.

If in step S108 the unit cell voltage of any of the unit cells 2 is below the highest unit cell voltage, the process of step S110 is selected. In step S110, a predetermined voltage recovery process is carried out. The voltage recovery process is the same as described in conjunction with Embodiment 1, and detailed description thereof will be omitted. The voltage recovery process is carried out until the unit cell voltage becomes greater than the highest unit cell voltage in the entire unit cells 2.

If in step S108 the unit cell voltage has exceeded the highest unit cell voltage in the entire unit cells 2, the process of step S112 is selected. In step S112, the warm-up power generation is continued.

According to the routine described above, the threshold voltage concerned with the voltage recovery process (i.e., the highest unit cell voltage) may be strictly set when warm-up power generation of the fuel cell 4 is performed. Therefore, it is possible to prevent the power generation from being stopped or restrained by the unnecessary performance of the voltage recovery process. Due to the acceleration of the warm-up through the utilization of the self-heating, the startability at low temperature may be improved.

Incidentally, in Embodiment 2, the control unit 30 carrying out the process of steps S108 and S110 may be regarded as "electric power generation control means" in the invention. Furthermore, the control unit 30 carrying out the processes of steps S100, S102 and S104 may be regarded as "threshold voltage setting means" in the invention. Furthermore, the control unit 30 carrying out the process of step S106 may be regarded as "oxidant gas supply control means" in the invention.

While the invention has been described with reference to example embodiments thereof, it is to be understood that the invention is not limited to the described embodiments or constructions. To the contrary, the invention is intended to cover various modifications and equivalent arrangements. In addition, while the various elements of the example embodiments are shown in various combinations and configurations, other combinations and configurations, including more, less or only a single element, are also within the spirit and scope of the invention.

For example, although, in Embodiment 1, the IR resistance of each unit cell is measured by the resistance meter, the IR resistance may instead be measured indirectly from another physical quantity. For example, the IR resistance may be calculated based on the measured values of the temperature of a unit cell and a moist degree of the MEA. Besides, although in Embodiments 1 and 2, the measurement of the unit cell temperature is performed for each unit cell, the unit cell temperature may be measured onto a representative unit cell, and the measured value may be used for the other unit cells.

Furthermore, in the power generation control in Embodiment 2, the same modification as in the power generation control in Embodiment 1 may be adopted. That is, even if the unit cell voltage becomes below the highest unit cell voltage, the voltage recovery process may not be carried out immediately, but may be carried out after the elapsed time from the time of the unit cell voltage becoming negative exceeds the permissible time a. Therefore, the startability at low temperature may be improved by the retarded timing of carrying out the voltage recovery process.

As shown in FIG. 2, at the time of lack of the cathode gas, the cathode potential is restrained to a very low electric potential as compared with the potential occurring during the normal power generation. Therefore, during a warm-up power generation mode utilizing the lack of the cathode gas, the influence of the fluctuation of the cathode on the unit cell voltage is reduced, and the threshold voltage (highest unit cell voltage) may be set correspondingly stricter. Concretely, although during a normal power generation mode, the threshold voltage is set relatively high (positive voltage) taking fluctuations of the cathode potential into account, the threshold voltage during the warm-up power generation mode may be set at a negative voltage. If the setting of the threshold voltage is switched between the normal power generation mode and the warm-up power generation mode, it becomes possible to prevent the unnecessary stop or restrain of the power generation at least during the warm-up power generation mode without increasing the risk of the degradation of the MEA resulting from the lack of the anode gas.

Incidentally, the supply of the cathode gas to the fuel cell 4 may be separately controlled between the normal power generation mode and the warm-up power generation mode. The method of the control may be a flow amount control or may also be a pressure control. When the cathode gas is sufficiently supplied in accordance with the required supply amount of the cathode gas from the load current (more specifically, the required mole amount of oxygen), it refers that the normal power generation is performed. When the cathode gas is insufficiently supplied with respect to the required supply amount from the load current, it refers that the warm-up power generation is performed. The control unit 30 that controls the supply of the cathode gas in this manner may be regarded as "oxidant gas supply control means" in the invention. Furthermore, The control unit 30 that switches the setting of the threshold voltage in accordance with the power generation modes may be regarded as "threshold voltage setting means" in the invention.

Incidentally, the power generation efficiency of the fuel cell 4 during the warm-up power generation mode (i.e., the second power generation efficiency) is lower than the power generation efficiency during the normal power generation mode (i.e., the first power generation efficiency). As Embodiment 3 of the invention, the control unit 30 restrains the decrease of the unit cell voltage (e.g., reduces the load current) when the voltage of the unit cell 2 fell to the predetermined threshold voltage. Also, the control unit 30 controls the supply of the oxidant gas based on the power generation efficiency of the fuel cell, and switches the setting of the predetermined threshold voltage in accordance with the power generation efficiency. That is, when the fuel cell 4 perform the power generation at the second power generation efficiency, the control unit 30 sets a lower threshold voltage than that of the first power generation efficiency, and restrains the decrease of the unit cell voltage using the lower threshold voltage.

On the other hand, the heat value of the fuel cell 4 during the warm-up power generation mode (i.e., the second heat value) is greater than the heat value during the normal power generation mode (i.e., the first heat value). Therefore, the control unit 30 may control the supply of the oxidant gas based on the heat value of the fuel cell, and restrain the decrease of the unit cell voltage using a lower threshold voltage than of the first heat value when the fuel cell 4 perform the power generation at the second heat value.

The invention claimed is:

1. A fuel cell system comprising:
   a fuel cell including a unit cell that generates electric power by an electrochemical reaction between a fuel gas supplied to an anode of the unit cell and an oxidant gas supplied to a cathode of the unit cell;
   a voltage measurement portion that measures a voltage of the unit cell;
   a power generation control portion that performs a voltage recovery process when the voltage of the unit cell is below a threshold voltage;

an IR resistance measurement portion that measures an IR resistance of the unit cell; and a threshold voltage setting portion programmed to store map data, wherein the map data approximates current-voltage characteristics that occur during a lack of anode gas, wherein the lack of anode gas is characterized by the fuel gas being supplied to the anode in an amount which causes the unit cell voltage to be a negative value, and further programmed to set the threshold voltage based on the voltage with respect to the load current obtained from the map data and an IR loss calculated from the IR resistance and the load current.

2. The fuel cell system according to claim 1, further comprising an oxidant gas supply control portion that supplies the oxidant gas to the fuel cell less than an amount of the oxidant gas which is determined based on the load current.

3. The fuel cell system according to claim 1, wherein the power generation control portion stops the power generation of the fuel cell when the voltage of the unit cell becomes lower than the threshold voltage.

4. The fuel cell system according to claim 1, wherein the fuel cell is formed by connecting a plurality of the unit cell in series.

5. A fuel cell system comprising:

a fuel cell including a unit cell that generates electric power by an electrochemical reaction between a fuel gas supplied to an anode of the unit cell and an oxidant gas supplied to a cathode of the unit cell;

a voltage measurement portion that measures a voltage of the unit cell;

a power generation control portion that performs a voltage recovery process when the voltage of the unit cell is below a threshold voltage;

an IR resistance measurement portion that measures an IR resistance of the unit cell; and a threshold voltage setting portion programmed to store map data, wherein the map data approximates current-voltage characteristics that occur during a lack of anode gas at a plurality of cell temperatures, wherein the lack of anode gas is characterized by the fuel gas being supplied to the anode in an amount which causes the unit cell voltage to be a negative value, and further programmed to set the threshold voltage based on the voltage with respect to the load current and the cell temperature obtained from the map data and an IR loss calculated from the IR resistance and the load current.

6. The fuel cell system according to claim 5, further comprising an oxidant gas supply control portion for supplying the oxidant gas to the fuel cell less than an amount of the oxidant gas which is determined based on the load current.

7. The fuel cell system according to claim 5, wherein the power generation control portion stops the power generation of the fuel cell when the voltage of the unit cell becomes lower than the threshold voltage.

8. The fuel cell system according to claim 5, wherein the fuel cell is formed by connecting a plurality of the unit cell in series.

* * * * *